(12) United States Patent
Chen et al.

(10) Patent No.: US 6,624,403 B2
(45) Date of Patent: Sep. 23, 2003

(54) AUTOFOCUS SYSTEM

(75) Inventors: Li Chen, Fremont, CA (US); Martin Ebert, Fremont, CA (US); Dale Linseth, Hollister, CA (US)

(73) Assignee: Therma-Wave, Inc., Fremont, CA (US)

( * ) Notice: Subject to any disclaimer, the term of this patent is extended or adjusted under 35 U.S.C. 154(b) by 0 days.

(21) Appl. No.: 09/975,515

(22) Filed: Oct. 11, 2001

(65) Prior Publication Data

US 2003/0071190 A1 Apr. 17, 2003

(51) Int. Cl.[7] ............... G02B 27/40; G03B 13/18
(52) U.S. Cl. ............ 250/201.2; 250/201.4; 250/559.29; 396/89
(58) Field of Search ............ 250/201.2, 201.4, 250/548, 559.29; 396/89, 106, 107, 111

(56) References Cited

U.S. PATENT DOCUMENTS

| 4,631,397 A | * | 12/1986 | Ohsato et al. | |
|---|---|---|---|---|
| 4,845,352 A | * | 7/1989 | Benschop | |
| 5,910,842 A | | 6/1999 | Piwonka-Corle et al. | ... 356/369 |
| 5,978,074 A | | 11/1999 | Opsal et al. | ............ 356/72 |
| 6,052,478 A | | 4/2000 | Wihl et al. | ............ 382/144 |

* cited by examiner

*Primary Examiner*—David Porta
*Assistant Examiner*—David C. Meyer
(74) *Attorney, Agent, or Firm*—Stallman & Pollock LLP

(57) ABSTRACT

An autofocus system for maintaining a sample in the focal plane of a primary lens is disclosed. A light source generates a monitor beam which is focused onto the sample through the primary lens. The reflected beam passes back through the primary lens and is directed to a secondary lens. The beam is then split by a reflective wedge into two portions with different path lengths such that the beam waists of the two portions are spatially separated. An aperture is located between the two beam waists. A bi-cell photodetector measures the intensity of the two beam portions transmitted by the aperture. The measured intensity levels vary with respect to the position of the sample. By comparing the measured intensity levels, an indication of the position of the sample can be obtained.

20 Claims, 5 Drawing Sheets

AUTOFOCUS SYSTEM

BACKGROUND OF THE INVENTION

A number of optical metrology devices now exist for characterizing the composition and structure of semiconductor wafers. Many of these systems include measurement beams which must be focused to very small spots to study very small features on the wafers. In order to maintain such small spots, an accurate autofocus system is required.

In the past, the optical metrology devices of the assignee included an autofocus system based on a Foucalt knife test principal. This mechanism is described in U.S. Pat. No. 5,978,074 incorporated by reference. This system included a rotating chopper wheel. It would be desirable to develop a system which did not require moving parts.

Other autofocus systems are described in U.S. Pat. Nos. 5,910,842 and 6,502,478, both incorporated herein by reference.

SUMMARY OF THE INVENTION

An autofocus system is disclosed for driving a sample into the focal plane of a primary microscope objective. A light source, preferably a laser, generates a collimated monitor beam which is focused onto the sample through the primary objective. The reflected beam passes back through the primary objective and is directed to a secondary focusing element. The beam is then split by a reflective wedge into two portions with different path lengths such that the beam waists of the two portions are spatially separated. An aperture is located between the two beam waists and equidistant therefrom when the sample is in focus. This location is also approximately where the two beams intersect.

A photodetector, preferably a bi-cell, is provided to measure the intensity of the two beam portions transmitted by the aperture. The measured intensity levels vary with respect to the position of the sample. By comparing the measured intensity levels, an indication of the position of the sample can be obtained. This indication can be used as a feedback signal to correct the position of the sample with respect to the primary objective.

BRIEF DESCRIPTION OF THE DRAWINGS

FIG. 4 is a graph illustrating the difference between the signals generated in FIGS. 3b and 3a.

DETAILED DESCRIPTION OF THE PREFERRED EMBODIMENT

Figure 1:
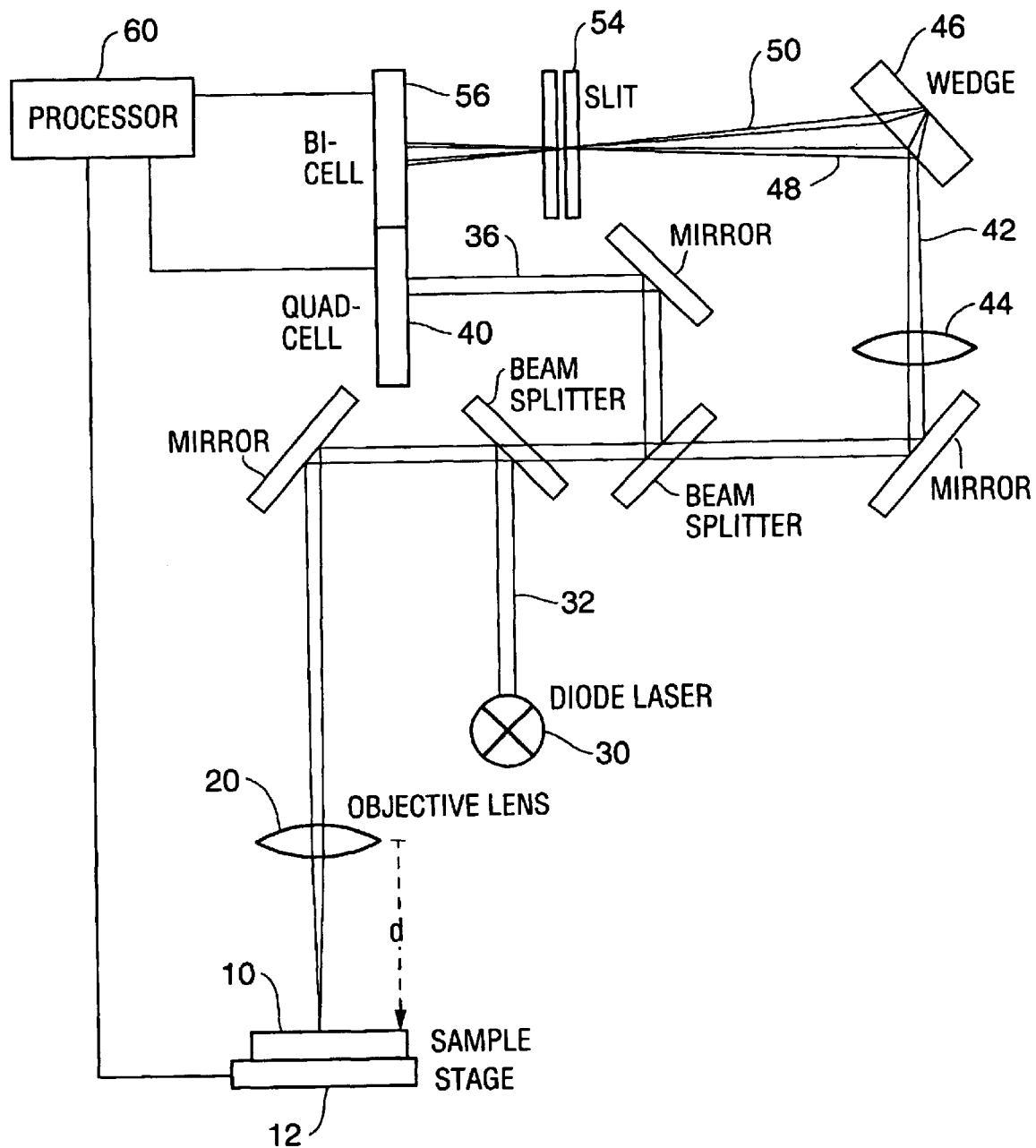
FIG. 1 is a schematic diagram of the optical elements of the autofocus system of the subject invention.

FIG. 1 shows a sample 10 resting on a stage 12 below an objective or primary lens 20. The objective lens is for focusing the probing beam (not shown) of an optical metrology device onto the sample.

Some examples of optical metrology devices using probing beams and autofocus systems are described in the above cited patents. The subject autofocus system would be suitable for use in such devices. In such devices, it is important to accurately control the distance "d" between the lens 20 and the sample 10 so that the sample will be in the focal plane of the lens and the beam will be tightly focused on the sample. Stage 12 is capable of being moved up or down (z-axis) to bring the top surface of the sample into focus.

In FIG. 1, lens 20 is shown as a single element for clarity. The primary focusing element in a metrology system can be a compound system including refractive, reflective or diffractive elements.

The autofocus system of the subject invention includes a light source for generating a collimated monitor beam. The light source is preferably a laser 30, such as a diode laser. The monitor beam 32 of the laser is directed to the sample through lens 20. A portion 36 of the reflected beam is directed to a first detector 40 for monitoring the reflected intensity of beam portion 36. The output of this detector is used to normalize the signal for autofocus detection as discussed below. In the preferred embodiment, detector 40 is a quad cell generating four outputs. The sum of the outputs is used for normalization. Differences in the outputs of the respective quadrants are indicative of the tilt angle of the sample.

Another portion 42 of the monitor beam is then focused by a secondary lens 44. In the illustrated embodiment, lens 44 is a single refractive element but could be a compound element or could be created with a curved mirror or a diffractive focusing element or any combination thereof. The converging beam 42 is directed to a reflective wedge 46. The front surface of the wedge creates a first reflection further splitting the beam into a first beam portion 48. The back surface of the wedge, which is preferably coated with a reflective surface such as aluminum oxide, creates a second reflection and second beam portion 50. The wedge angle and angular orientation of the wedge are configured so that two beam portions 46 and 48 will cross each other. Note that the path of beam 50, which passes through the wedge twice, is slightly longer than the path of beam 48. Accordingly, the focal planes (waists) of the beam portions 48 and 50 will be spatially separated.

An aperture or slit 54 is located in the path of the beam portions 48 and 50, preferably near where the beam portions intersect. In addition, the aperture 54 is located so that when the sample is correctly positioned with respect to the objective lens 20 (i.e. in the focal plane of the lens 20), the aperture will be between and equidistant from the focal planes of the two beam portions 48 and 50. The reason for this positioning will be explained below. In a constructed embodiment, slit 54 was a narrow rectangle, 2 mm in length and 50 microns in height with the length axis aligned parallel to the common axis of both beam portions at that location.

A photodetector 56 is located behind the slit 54. In the preferred embodiment, photodetector 56 is a bi-cell, although it can be two separate detectors. The detector is configured and positioned so that one element of the bi-cell measures the intensity of beam portion 48 while the other element of the bi-cell measures the intensity of beam portion 50. The outputs of the bi-cell (first and second output signals) are supplied to a processor 60 for determining the focus of the sample. The processor is used to control the stage 12 in order to raise or lower the sample into proper focus.

Figure 2A:
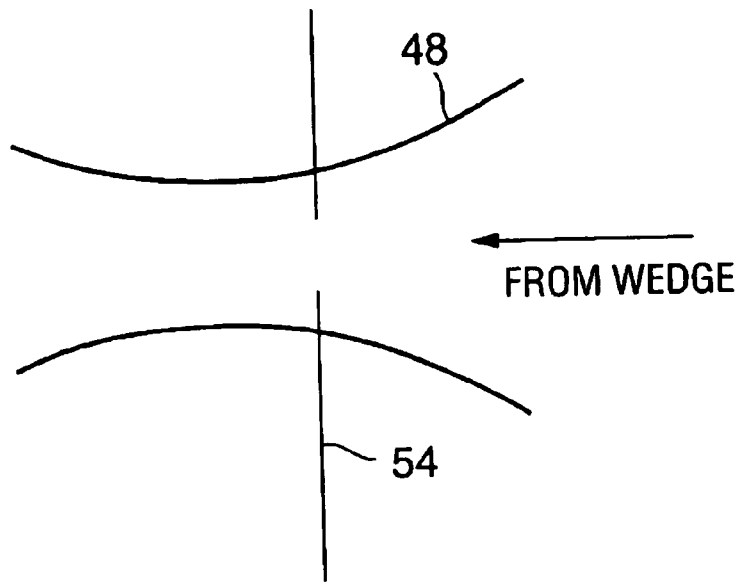
FIGS. 2a and 2b illustrate the beam waists of the beam portions with respect to the aperture
Figure 2B:
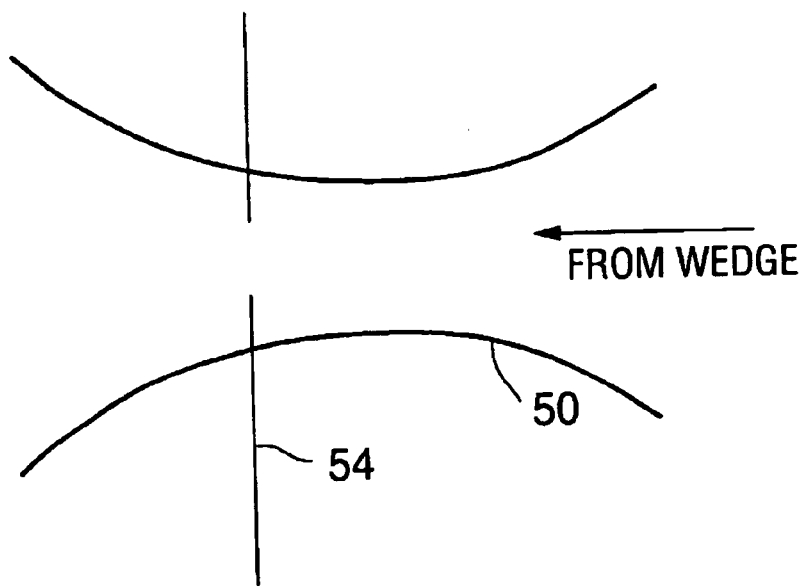

The operation of the autofocus system can best be understood by referring to FIGS. 2 and 3. FIGS. 2a and 2b show the aperture 54 with respect to the beam portions 48 and 50 respectively when the sample is in focus. The two beam portions are shown in separate figures for clarity, however, it should be understood that in the illustrated embodiment, both beam portions pass through the aperture simultaneously. In addition, and for better understanding, the shape of the beam on the left (downstream) side of the aperture is shown as if the aperture was not present. (As can be appreciated, any light striking the aperture plate beyond the edge of the aperture on the right (upstream) side thereof would be blocked and would not appear on the left side of the plate). As seen in FIG. 2a, when the sample is in focus, the focal plane (or beam waist if light source is a laser) of beam portion 48 is located on the left side of the aperture. In contrast, the focal plane of the beam portion 50 (beam waist) falls on the right side of aperture (FIG. 2b) since beam portion 50 has a longer path length due to its passing in and out of the wedge 46.

When the beam strikes the aperture, a portion thereof will be transmitted. The amount transmitted will be a function of the position of the sample with respect to the primary lens. If the position of the sample falls below the focal plane of the primary lens, the focal planes (beam waists) of the beam portions will move to the right in the FIG. 2 (which would be equivalent to moving the aperture to the left in FIG. 2). Conversely, if the position of the sample is moved above the focal plane of the primary lens, the focal plane (beam waists) of the beam portions will move to the left in the FIG. 2 (which would be equivalent to moving the aperture to the right in FIG. 2).

Figure 3A:
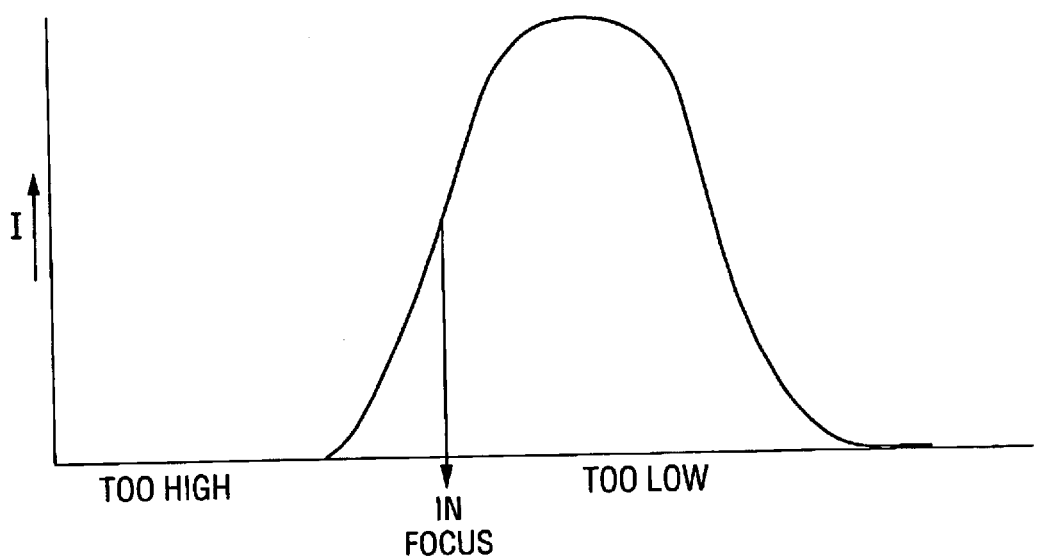
FIGS. 3a and 3b illustrate the intensity measured at the detectors as a function of sample position.
Figure 3B:
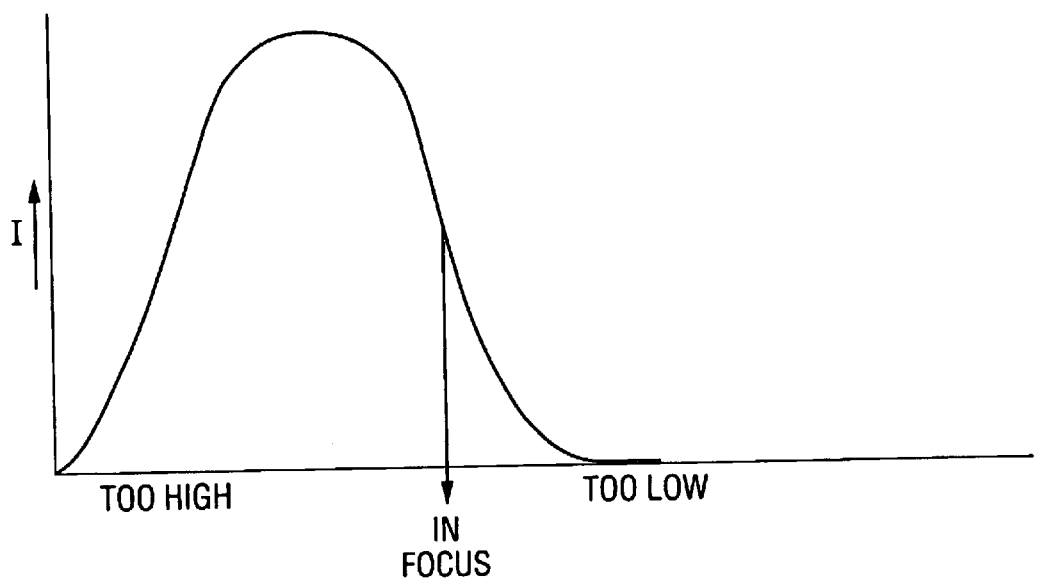

The effect on the amount of light passing through the aperture and reaching the detectors as a function of sample position is shown in FIGS. 3a and 3b for beam portions 48 and 50 respectively. From a starting point of the beam in focus, if the sample is lowered, the waist of beam portion 48 will move to the right so that more light will pass through the aperture (a greater portion of the total beam energy overlaps the aperture.) This is seen as a rise in measured intensity on the right side of FIG. 3a. Conversely, if the sample is raised above the focal point, the beam waist of portion 48 will move to the left reducing the fraction of the total beam encompassed by the aperture. This will cause the detector to record a lower intensity level as shown on the left portion of FIG. 3a.

As noted above, lowering of the sample will also cause the waist of beam portion 50 to move to the right. However, in this case, since the beam waist is already to the right of the aperture, the beam intensity transmitted by the aperture will drop as shown on the right side of FIG. 3b. Conversely, raising the sample above the focal plane will cause the beam waist of portion 50 to move to the left, increasing the transmitted intensity as the beam waist nears the aperture as shown on the left hand side of FIG. 3b.

Figure 4:
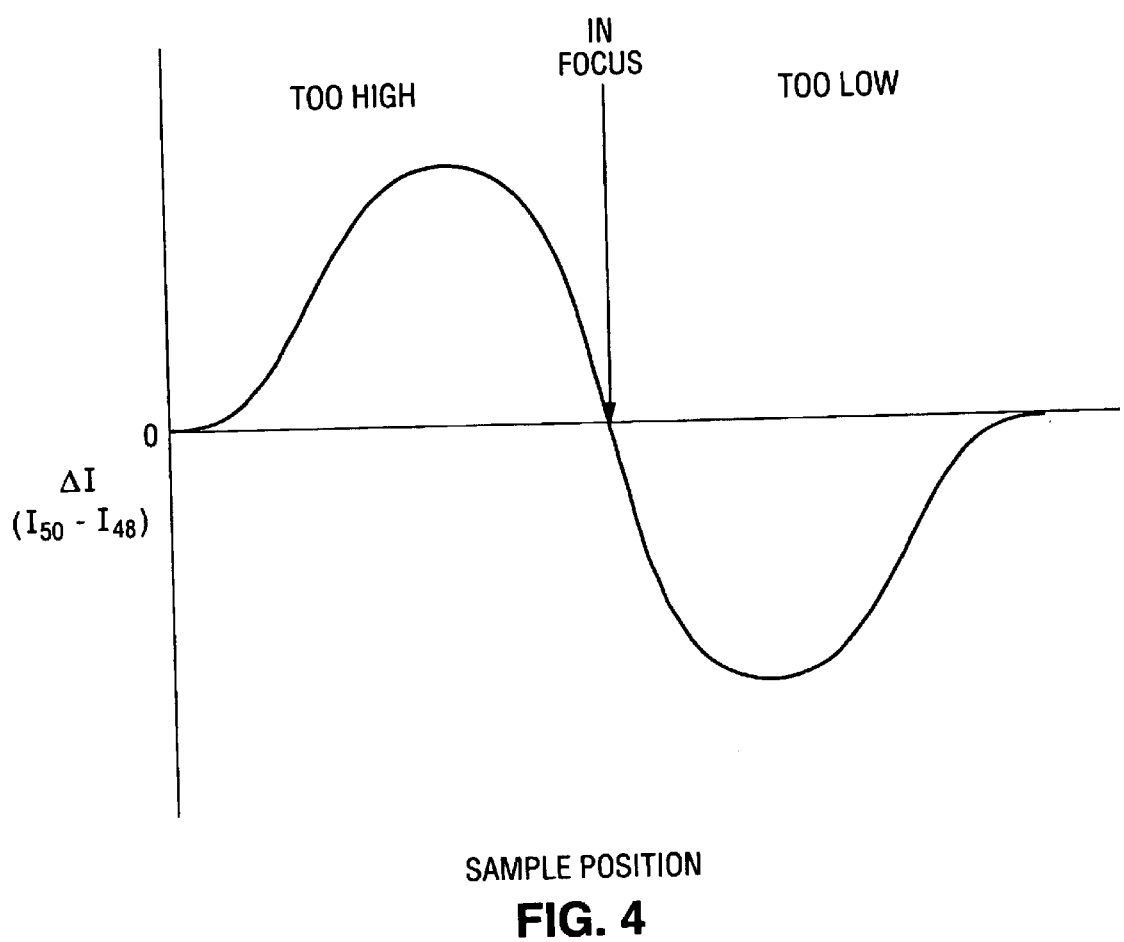

The output signals generated by the detector 56 and represented in FIG. 3 are sent to the processor 60. The processor functions to calculate a difference between the two intensity levels. This difference ($\Delta I = I_{50} - I_{48}$) is plotted in FIG. 4. As can be seen, when the sample is in focus, the two intensity signals from the bi-cell should be equal and the difference is zero. Any sample positions away from the focus location results in a non-zero difference signal. The rate of change of the difference is relatively steep near the focal region so that the measurement is very sensitive to an out of focus condition. The difference signal can be used by the processor to control the stage position to bring the sample into focus.

As noted above, in the preferred embodiment, a detector 40 is provided to measure the full intensity of the reflected beam. This measurement is used by processor 60 to normalize the measurement from the detector 56. In this way, significant differences in the reflectivity of various samples will not adversely effect the electronics used to calculate autofocus signal.

Normalization against reflectivity variations can be achieved either by the traditional simple division approach, or by other means. Normalization after A/D conversion is undesirable, because of the limited dynamic range of the A/D converter.

The traditional analog divider approach has limitations at the low reflectivity range, due to attenuation of the reference signal (divisor). As the gain increases to compensate, this also amplifies error contributions in the signal path (the detected bicell signal). For this reason, the traditional approach to normalization degrades performance, making effective control impossible over reflectivity variations in excess of 100:1. To achieve a useable 200:1 or more dynamic range, an AGC approach to normalization is used.

Figure 5:
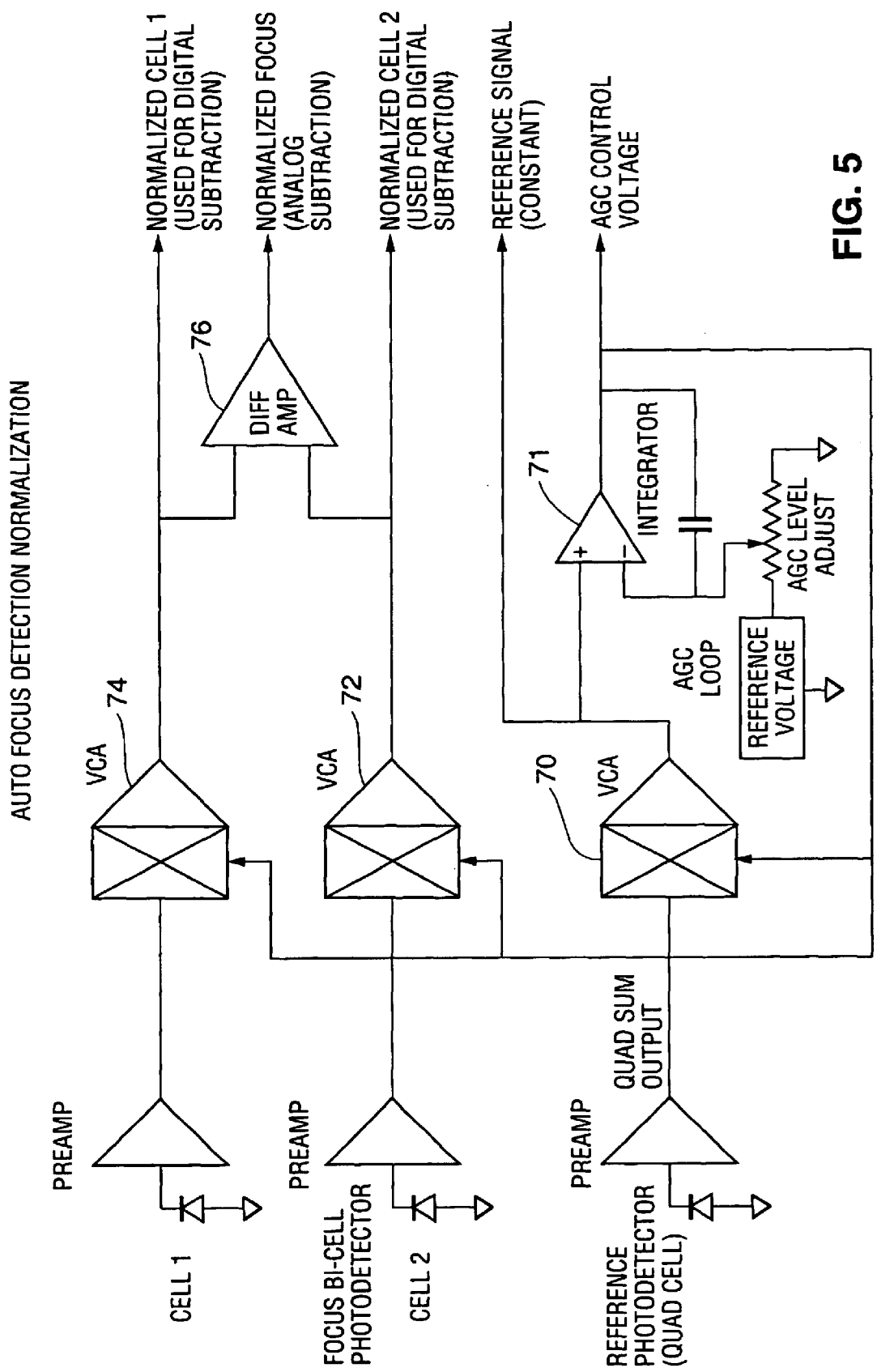
FIG. 5 is a schematic diagram of an autofocus circuit including normalization with automatic gain control.

FIG. 5 is a schematic diagram of a preferred circuit. In this circuit, the reference signal gain is adjusted to result in a constant level at the output of the reference signal gain stage, via AGC (automatic gain control), which follows the traditional photodiode preamp operating in transimpedance mode. Gain adjustment is achieved with a VCA (voltage controlled amplifier) 70, operating as a current in, current out device, followed by a precision transimpedance amplifier 71, selected to minimize error sources in the frequency range of interest. Servo control of the gain in the signal chain achieves a constant detected reference signal level, which is independent of the reflectivity of the sample. This is achieved via closed loop servo control of the gain control terminal of the VCA, by comparing the preamp level with a fixed reference level, and thereby boosting the gain up or down accordingly. This maintains a useable signal level with low error contributions. Loop bandwidth of the servo control of gain is adjusted to respond only to the frequency range of interest, thus eliminating error sources outside of this range.

The resulting control voltage is then fed to the bicell VCA's 72, 74 (used for focus detection), thus achieving the desirable gain of the bicell signal detection path in an identical manner, to produce a constant level at focus, which is independent of sample reflectivity.

Focus is detected by subtracting the resulting bi-cell signals via difference amplifier 76.

It is conceivable that the output from amplifier 76 will be prone to some errors due to the either corruption from DC offsets and drift, which are inversely proportional to sample reflectivity and differences in intensity between the two detected cell signals (in excess of 10% or so).

In order to reduce error contributions in the signal chain, it would also be possible to convert each of the two normalized bicell signals into digital signals via individual A/D converters. The resulting digital cell signals can then be normalized, and DC errors subtracted out via digital means, to remove the errors due to differences in light level at the two halves of the bicell, and to remove electronic offset contributions in the signal chain, which would otherwise be particularly troublesome at the low reflectivity range of the spectrum.

While the subject invention has been described with reference to a preferred embodiment, various changes and modifications could be made therein, by one skilled in the art, without varying from the scope and spirit of the subject invention as defined by the appended claims.

For example, optical combinations other than the wedge 46 can be used to create the two different beam portions. A thin foil which reflects a portion of the beam backed by an angled high reflector could be used. However, the single element wedge has the advantage of being easier to align. It would also be possible to use a parallelogram in place of the wedge. In this case, the two beam portions would be parallel. Either one or two slits might be necessary. The advantage of the wedge is that one can more easily create the separation of the two beam portions at the detector by relying on angles rather than the thickness of the splitter. Depending upon the angle of the wedge, it would also be possible to use two separate slits located either before or after the two beam portions crossed paths.

We claim:

1. An apparatus for evaluating whether a sample is in the focal plane of a primary focusing element of a measurement device comprising:

a light source for generating a monitor beam, said beam being directed to reflect off the sample via the primary focusing element;

a secondary focusing element for focusing the reflected monitor beam;

means for splitting the reflected monitor beam into first and second beam portions, with the beam path of the first portion being longer than the second portion so that the focal planes of the two beam portions are spatially separated;

an aperture in the path of the beam portions and positioned such that when the sample is in the focal plane of the primary focusing element, said aperture is located in between the focal planes of the two beam portions; and a detector for monitoring the intensity of the respective first and second beam portions after passing through the aperture and generating first and second output signals, said first and second output signals providing information about the location of the sample with respect to the primary focusing element.

2. An apparatus for evaluating whether a sample is in the focal plane of a primary focusing element of a measurement device comprising:

a light source for generating a monitor beam, said beam being directed to reflect off the sample via the primary focusing element;

a secondary focusing element for focusing the reflected monitor beam;

a wedge shaped optic for splitting the reflected monitor beam into first and second beam portions, with the beam path of the first portion being longer than the second portion so that the focal planes of the two beam portions are spatially separated and wherein the rear surface of the wedge shaped optic includes a high reflection coating;

an aperture in the path of the beam portions and positioned such that when the sample is in the focal plane of the primary focusing element, said aperture is located in between the focal planes of the two beam portions; and a detector for monitoring the intensity of the respective first and second beam portions after passing through the aperture and generating first and second output signals, said first and second output signals providing information about the location of the sample with respect to the primary focusing element.

3. An apparatus for evaluating whether a sample is in the focal plane of a primary focusing element of a measurement device comprising:

a light source for generating a monitor beam, said beam being directed to reflect off the sample via the primary focusing element;

a secondary focusing element for focusing the reflected monitor beam;

means for splitting the reflected monitor beam into first and second beam portions, with the beam path of the first portion being longer than the second portion so that the focal planes of the two beam portions are spatially separated and wherein the means for splitting the monitor beam is a combination of a partially transparent foil and a highly reflective member located behind the foil;

an aperture in the path of the beam portions and positioned such that when the sample is in the focal plane of the primary focusing element, said aperture is located in between the focal planes of the two beam portions; and a detector for monitoring the intensity of the respective first and second beam portions after passing through the aperture and generating first and second output signals, said first and second output signals providing information about the location of the sample with respect to the primary focusing element.

4. An apparatus as recited in claim 1 wherein said light source is a laser.

5. An apparatus as recited in claim 1 wherein the propagation axes of the two beam portions are parallel and spatially separated and further including separate apertures for each beam portion.

6. An apparatus as recited in claim 1 wherein said detector is a bi-cell.

7. An apparatus for evaluating whether a sample is in the focal plane of a primary focusing element of a measurement device comprising:

a light source for generating a monitor beam, said beam being directed to reflect off the sample via the primary focusing element;

a secondary focusing element for focusing the reflected monitor beam;

means for splitting the reflected monitor beam into first and second beam portions, with the beam path of the first portion being longer than the second portion so that the focal planes of the two beam portions are spatially separated;

an aperture in the path of the beam portions and positioned such that when the sample is in the focal plane of the primary focusing element, said aperture is located in between the focal planes of the two beam portions; and a detector for monitoring the intensity of the respective first and second beam portions after passing through the aperture and generating first and second output signals, said first and second output signals providing information about the location of the sample with respect to the primary focusing element and wherein when said sample is in the focal plane of the primary focusing element, the aperture is located equidistant from the focal planes of the two beam portions.

8. An apparatus as recited in claim 1 wherein the propagation axes of the two beam portions intersect near the aperture.

9. An apparatus as recited in claim 1 further including a processor for evaluating the output signals from the detector to determine whether the sample is in the focal plane of the primary focusing element.

10. An apparatus as recited in claim 9 wherein the processor generates a signal to adjust the position of the sample if the sample is not in the focal plane of the primary focusing element.

11. An apparatus as recited in claim 1 wherein the propagation axes of the two beam portions are spatially separated and further including separate apertures for each beam portion.

12. An apparatus for evaluating whether a sample is in the focal plane of a primary focusing element of a measurement device comprising:
- a light source for generating a monitor beam, said beam being directed to reflect off the sample via the primary focusing element;
- a secondary focusing element for focusing the reflected monitor beam;
- means for splitting the reflected monitor beam into first and second beam portions, with the beam path of the first portion being longer than the second portion so that the focal planes of the two beam portions are spatially separated;
- an aperture in the path of the beam portions and positioned such that when the sample is in the focal plane of the primary focusing element, said aperture is located in between the focal planes of the two beam portions; and
- a detector for monitoring the intensity of the respective first and second beam portions after passing through the aperture and generating first and second output signals, said first and second output signals providing information about the location of the sample with respect to the primary focusing element and further including a means for normalizing the monitored intensities of the first and second beam portions.

13. An apparatus for evaluating whether a sample is in the focal plane of an objective primary lens of a measurement device comprising:
- a laser for generating a monitor beam, said beam being directed to reflect off the sample through the primary lens;
- a secondary focusing element for focusing the reflected monitor beam;
- an optical wedge for splitting the reflected monitor beam into first and second beam portions, with the beam path of the first portion being longer than the second portion so that the beam waists of the two beam portions are spatially separated and such that the beam portions intersect;
- an aperture in the path of the beam portions and positioned near the intersection thereof and in a location in between and equidistant from the focal planes of the two beam portions when the sample is in the focal plane of the primary lens;
- first and second detectors for monitoring the intensity of the respective first and second beam portions after passing through the aperture and generating first and second output signals, the first and second output signals being equal when the sample is in the focal plane of the primary lens; and
- a processor for evaluating any difference between the first and second output signals to evaluate whether the sample is in the focal plane of the primary lens.

14. An apparatus as recited in claim 13 wherein the processor generates a signal to adjust the position of the sample if there is any difference between the first and second output signals.

15. An apparatus for evaluating whether a sample is in the focal plane of an objective primary lens of a measurement device comprising:
- a laser for generating a monitor beam, said beam being directed to reflect off the sample through the primary lens;
- a secondary focusing element for focusing the reflected monitor beam;
- an optical wedge for splitting the reflected monitor beam into first and second beam portions, with the beam path of the first portion being longer than the second portion so that the beam waists of the two beam portions are spatially separated and such that the beam portions intersect;
- an aperture in the path of the beam portions and positioned near the intersection thereof and in a location in between and equidistant from the focal planes of the two beam portions when the sample is in the focal plane of the primary lens;
- first and second detectors for monitoring the intensity of the respective first and second beam portions after passing through the aperture and generating first and second output signals, the first and second output signals being equal when the sample is in the focal plane of the primary lens; and
- a processor for evaluating any difference between the first and second output signals to evaluate whether the sample is in the focal plane of the primary lens and further including a means for normalizing the monitored intensities of the first and second beam portions.

16. An apparatus for evaluating whether a sample is in the focal plane of an objective primary lens of a measurement device comprising:
- a laser for generating a monitor beam, said beam being directed to reflect off the sample through the primary lens;
- a secondary focusing element for focusing the reflected monitor beam;
- a beam splitter positioned to divide the reflected monitor beam into first and second beam portions, with the beam path of the first portion being longer than the second portion so that the beam waists of the two beam portions are spatially separated;
- an aperture in the path of the beam portions and positioned near the intersection thereof and in a location in between and equidistant from the focal planes of the two beam portions when the sample is in the focal plane of the primary lens;
- first and second detectors for monitoring the intensity of the respective first and second beam portions after passing through the aperture and generating first and second output signals, the first and second output signals being equal when the sample is in the focal plane of the primary lens; and
- a processor for evaluating any difference between the first and second output signals to evaluate whether the sample is in the focal plane of the primary lens.

17. An apparatus as recited in claim 16 wherein the processor generates a signal to adjust the position of the sample if there is any difference between the first and second output signals.

18. An apparatus for evaluating whether a sample is in the focal plane of an objective primary lens of a measurement device comprising:
- a laser for generating a monitor beam, said beam being directed to reflect off the sample through the primary lens;

a secondary focusing element for focusing the reflected monitor beam;

a wedge shaped beam splitter positioned to divide the reflected monitor beam into first and second beam portions, with the beam path of the first portion being longer than the second portion so that the beam waists of the two beam portions are spatially separated;

an aperture in the path of the beam portions and positioned near the intersection thereof and in a location in between and equidistant from the focal planes of the two beam portions when the sample is in the focal plane of the primary lens;

first and second detectors for monitoring the intensity of the respective first and second beam portions after passing through the aperture and generating first and second output signals, the first and second output signals being equal when the sample is in the focal plane of the primary lens; and a processor for evaluating any difference between the first and second output signals to evaluate whether the sample is in the focal plane of the primary lens.

19. An apparatus for evaluating whether a sample is in the focal plane of an objective primary lens of a measurement device comprising:

a laser for generating a monitor beam, said beam being directed to reflect off the sample through the primary lens;

a secondary focusing element for focusing the reflected monitor beam;

a beam splitter positioned to divide the reflected monitor beam into first and second beam portions, with the beam path of the first portion being longer than the second portion so that the beam waists of the two beam portions are spatially separated;

an aperture in the path of the beam portions and positioned near the intersection thereof and in a location in between and equidistant from the focal planes of the two beam portions when the sample is in the focal plane of the primary lens;

first and second detectors for monitoring the intensity of the respective first and second beam portions after passing through the aperture and generating first and second output signals, the first and second output signals being equal when the sample is in the focal plane of the primary lens; and a processor for evaluating any difference between the first and second output signals to evaluate whether the sample is in the focal plane of the primary lens and further including a means for normalizing the monitored intensities of the first and second beam portions.

20. An apparatus for evaluating whether a sample is in the focal plane of a primary focusing element of a measurement device comprising:

a light source for generating a monitor beam, said beam being directed to reflect off the sample via the primary focusing element;

a secondary focusing element for focusing the reflected monitor beam;

means for splitting the reflected monitor beam into first and second beam portions, with the beam path of the first portion being longer than the second portion so that the focal planes of the two beam portions are spatially separated;

aperture means in the path of the beam portions and positioned such that when the sample is in the focal plane of the primary focusing element, said aperture means is located in between the focal planes of the two beam portions; and a detector for monitoring the intensity of the respective first and second beam portions after passing through the aperture and generating first and second output signals, said first and second output signals providing information about the location of the sample with respect to the primary focusing element.

* * * * *

UNITED STATES PATENT AND TRADEMARK OFFICE
CERTIFICATE OF CORRECTION

PATENT NO. : 6,624,403 B2  Page 1 of 1
DATED : September 23, 2003
INVENTOR(S) : Li Chen et al.

It is certified that error appears in the above-identified patent and that said Letters Patent is hereby corrected as shown below:

<u>Title page,</u>
Item [75], Inventors, change "Linseth" to -- Lindseth --.

Signed and Sealed this

Seventeenth Day of February, 2004

JON W. DUDAS
*Acting Director of the United States Patent and Trademark Office*